US010846927B2

(12) United States Patent
Zhou et al.

(10) Patent No.: US 10,846,927 B2
(45) Date of Patent: Nov. 24, 2020

(54) METHOD AND APPARATUS FOR DISPLAYING A BULLET-STYLE COMMENT IN A VIRTUAL REALITY SYSTEM

(71) Applicant: Tencent Technology (Shenzhen) Company Limited, Shenzhen (CN)

(72) Inventors: Yang Zhou, Shenzhen (CN); Qi Nie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/559,481

(22) Filed: Sep. 3, 2019

(65) Prior Publication Data

US 2019/0392636 A1  Dec. 26, 2019

Related U.S. Application Data

(63) Continuation of application No. PCT/CN2018/085287, filed on May 2, 2018.

(30) Foreign Application Priority Data

Jun. 2, 2017  (CN) .......................... 2017 1 0412093

(51) Int. Cl.
*G06T 15/00* (2011.01)
*G06T 19/00* (2011.01)
(Continued)

(52) U.S. Cl.
CPC .............. *G06T 19/00* (2013.01); *G06T 15/20* (2013.01); *G06T 2219/004* (2013.01);
(Continued)

(58) Field of Classification Search
CPC ............. H04N 21/4312; H04N 21/431; H04N 21/4788; H04N 21/8456; H04N 21/845;
(Continued)

(56) References Cited

U.S. PATENT DOCUMENTS

| 9,959,261 | B2* | 5/2018 | Kim ...................... G06F 19/321 |
| 2006/0101491 | A1* | 5/2006 | Tsuruta .................. H04N 21/84 725/58 |

(Continued)

FOREIGN PATENT DOCUMENTS

| CN | 202038432 U | 2/2016 |
| CN | 105916001 A | 8/2016 |

(Continued)

OTHER PUBLICATIONS

Tencent Technology, ISR, PCT/CN2018/085287, Jul. 27, 2018, 2 pgs.

(Continued)

Primary Examiner — Martin Mushambo
(74) Attorney, Agent, or Firm — Morgan, Lewis & Bockius LLP

(57) ABSTRACT

Embodiments of this application provide a method performed at a virtual reality (VR) device for displaying a bullet screen. The method includes: rendering a virtual three-dimensional space scene using the VR device; displaying a frame in the virtual three-dimensional space scene; defining a first position and a second position, the first position and the second position having different visual depths in the three-dimensional space scene; displaying a first bullet screen at at least one of the first position and the second position in the three-dimensional space scene. Accordingly, the embodiments of this application further provide an apparatus for implementing the method.

20 Claims, 4 Drawing Sheets

(51) Int. Cl.
*G06T 15/20* (2011.01)
*H04N 21/431* (2011.01)
*H04N 21/81* (2011.01)

(52) U.S. Cl.
CPC .... *G06T 2219/024* (2013.01); *H04N 21/4312* (2013.01); *H04N 21/816* (2013.01)

(58) Field of Classification Search
CPC ........... H04N 21/47217; H04N 21/472; H04N 21/4884
See application file for complete search history.

(56) References Cited

U.S. PATENT DOCUMENTS

| | | | |
|---|---|---|---|
| 2007/0024597 A1* | 2/2007 | Matsuoka | G06F 3/04883 345/173 |
| 2007/0159476 A1* | 7/2007 | Grasnick | H04N 13/275 345/419 |
| 2009/0051685 A1* | 2/2009 | Takagi | H04N 13/361 345/419 |
| 2009/0085918 A1* | 4/2009 | Hollingworth | G06T 3/40 345/475 |
| 2010/0023878 A1 | 1/2010 | Douris et al. | |
| 2011/0029918 A1* | 2/2011 | Yoo | G06F 3/017 715/800 |
| 2014/0181630 A1* | 6/2014 | Monney | G06K 9/209 715/232 |
| 2016/0321841 A1* | 11/2016 | Christen | G06F 3/167 |
| 2016/0371886 A1* | 12/2016 | Thompson | G06F 3/013 |
| 2017/0242260 A1* | 8/2017 | Song | G02B 30/40 |
| 2017/0289634 A1* | 10/2017 | E | H04N 21/4316 |
| 2018/0007442 A1* | 1/2018 | Peng | G06Q 20/34 |

FOREIGN PATENT DOCUMENTS

| | | |
|---|---|---|
| CN | 106162303 A | 11/2016 |
| CN | 106162370 A | 11/2016 |
| CN | 106210861 A | 12/2016 |
| CN | 106331879 A | 1/2017 |

OTHER PUBLICATIONS

Tencent Technology, WO, PCT/CN2018/085287, Jul. 27, 2018, 6 pgs.
Tencent Technology, IPRP, PCT/CN2018/085287, Dec. 3, 2019, 7 pgs.

* cited by examiner

METHOD AND APPARATUS FOR DISPLAYING A BULLET-STYLE COMMENT IN A VIRTUAL REALITY SYSTEM

CROSS-REFERENCE TO RELATED APPLICATIONS

This application is a continuation application of PCT/CN2018/085287, entitled "METHOD AND APPARATUS FOR DISPLAYING BULLET SCREEN AND STORAGE MEDIUM" filed on May 2, 2018, which claims priority to Chinese Patent Application No. 201710412093.2, entitled "METHOD AND APPARATUS FOR DISPLAYING BULLET SCREEN" filed with the China National Intellectual Property Administration on Jun. 2, 2017, both of which are incorporated herein by reference in their entirety.

FIELD OF THE TECHNOLOGY

This application relates to the technical field of Virtual Reality (VR), and in particular, to a method and an apparatus for displaying a bullet screen and a storage medium.

BACKGROUND OF THE DISCLOSURE

"Bullet screen", or "dan'mu" in Chinese, is an emerging new feature on online video sites in countries like China and Japan, which allows real-time comments from viewers to fly across the screen like bullets. With popularization and development of bullet screen technologies, more and more users use a bullet screen function when viewing videos played on computers, TV, and intelligent terminals. Due to a limited size of a display screen, in a situation that there are many bullet screens, readability of the bullet screens is influenced.

In another aspect, with development of VR technologies, how to provide a better method for displaying a bullet screen for VR technologies to enhance user experience is a problem to be solved urgently in the art.

SUMMARY

This application provides a method for displaying a bullet screen, applicable for a Virtual Reality (VR) device, the method including: rendering a virtual three-dimensional space scene using the VR device; displaying a frame in the virtual three-dimensional space scene; defining a first position and a second position, the first position and the second position having different visual depths in the three-dimensional space scene; displaying a first bullet screen at at least one of the first position and the second position in the three-dimensional space scene.

This application further provides a Virtual Reality (VR) device for displaying a bullet screen, including: a memory, configured to store a program; and a processor, connected to the memory and a display, and configured to execute the program stored in the memory. When the program is being executed, the processor is configured to perform operations including: rendering a virtual three-dimensional space scene using the VR device; displaying a frame in the virtual three-dimensional space scene; defining a first position and a second position, the first position and the second position having different visual depths in the three-dimensional space scene; displaying a first bullet screen at at least one of the first position and the second position in the three-dimensional space scene.

This application further provides a non-volatile computer-readable storage medium storing a plurality of programs in connection with a Virtual Reality (VR) device for displaying a bullet screen. The plurality of programs, when executed by the VR device, cause the VR device to perform the foregoing method for displaying a bullet screen.

DESCRIPTION OF EMBODIMENTS

The technical solution of this application is described with reference to the following accompanying drawings.

The method for displaying a bullet screen in an embodiment of this application may be applied to a VR system. The apparatus for displaying a bullet screen in an embodiment of this application may include a device for playing a VR video. For example, the apparatus for displaying a bullet screen may be a VR device.

It should be understood that, the VR system may also be called as a virtual reality technology or an artificial environment. The VR system may simulate and generate a virtual three-dimensional space scene by using the VR device, to provide for a user simulated scenes of sense organs such as vision, sense of hearing, or sense of touch. The user may, through the VR system, experience a virtual three-dimensional space scene or interact with the virtual three-dimensional space scene.

The following will describe the VR device 10 and an application environment according to an embodiment of this application with reference to the accompanying drawings.

Figure 1:
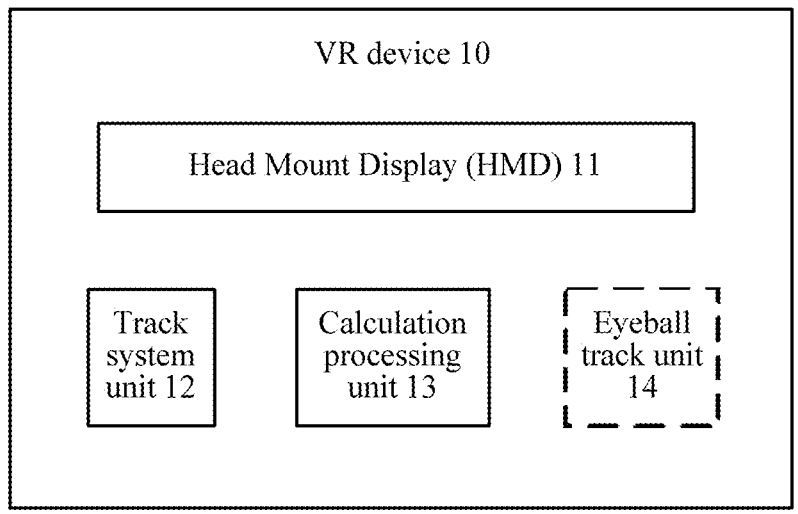
FIG. 1 is a schematic diagram of an apparatus according to an embodiment of this application.

FIG. 1 is a schematic diagram of the VR device 10 according to an embodiment of this application. It should be noted that, an example in FIG. 1 only assists a person skilled in the art to understand the embodiment of this application, rather than limiting this embodiment of this application to a specific illustrated scene. Apparently, according to the example in FIG. 1, a person skilled in the art may make various equivalent modifications and changes, and such modifications and changes fall in the scope of this embodiment of this application.

The VR device 10 usually may include the following modules:

A Head Mount Display (HMD) 11 is configured to display a virtual three-dimensional space scene and play a frame. The Head Mount Display (HMD) 11 may also be called as VR glasses, is a hardware device, and may seal vision and sense of hearing of a user from the outside and guide the user to generate a feeling in a virtual environment. Regarding the display principle, left-eye and right-eye images are respectively displayed on a left-eye screen and a right-eye screen, and after the eyes obtain the different information, a three-dimensional space scene image with stereoscopic perception is generated in the user's mind.

In some embodiments, the HMD 11 may further include an eyeball track unit 14 and the eyeball track unit 14 may obtain a real-time moving track of an eyeball of the user. Eyeball track may also be called as fixation point tracking. The eyeball track unit 14 may use a sensor to capture and extract eyeball feature information, measure a moving situation of an eye, estimate a direction of a sight line, or estimate a position of a fixation point of the eye. For example, a common implementation principle of an eyeball track technology lies in obtaining an eyeball direction (1, θ, φ) of an eyeball by using the following three technologies.

1. Track according to feature changes of the eyeball and the periphery of the eyeball.
2. Track according to an angle change of an iris.
3. Actively project a light beam such as infrared ray on the iris to extract features.

For example, two infrared cameras may be embedded into the eye positions of the HMD 11, the infrared cameras may be placed under spectacle lenses, to track movement of pupils of the user without influencing a range of a sight line.

A track system unit 12 is configured to track position information and movement information of the user in a real three-dimensional space. The track system unit 12 usually may be used as an external device of the HMD 11 or may be integrated in the HMD 11. The track system unit 12 usually includes a built-in sensor, a gyroscope, and a magnetometer.

A calculation processing unit 13 is configured to obtain real-time position information and movement information of the user from the track system unit 12 and calculate an orientation of a visual field of the head of the user in the virtual three-dimensional space scene and a three-dimensional coordinate of a real-time fixation point of the user in the virtual three-dimensional space scene, and instruct the HMD 11 to perform a corresponding frame switching operation or the like according to the obtained position information and movement information of the user. The track system unit 12 and the calculation processing unit 13 may capture the movement information of the user to create immersive experience. For example, when the user raises the head when wearing the HMD 11, the calculation processing unit 13, upon receipt of the movement information of the user sent by the track system unit 12, may instruct the HMD 11 to switch a displayed frame to the sky.

It should be understood that, the VR device 10 usually may be an integrated VR device 10 or a separated VR device 10. For example, the separated VR device 10 may include an HMD 11 and a calculation processing unit 13 independent of each other. The calculation processing unit 13 may be connected to the HMD 11, to control the HMD 11 to display the virtual three-dimensional space scene. The calculation processing unit 13 may be connected to the HMD 11 in a wired or wireless manner. Specifically, the track system unit 12 may be a module independent of other devices or may be disposed in the HMD 11. The eyeball track unit 14 may be disposed in the HMD 11. The calculation processing unit 13 may include an intelligent mobile phone, a tablet computer, a desktop computer, a notebook computer, or another intelligent device that can perform calculation. Furthermore, for example, the integrated VR device may be understood as that the HMD 11, the track system unit 12, and the calculation processing unit 13 in the separated VR device 10 are integrated in the same device.

In some embodiments, the VR device 10 further includes other units, for example, the VR device 10 may further include a storage unit configured to store related instructions, to-be-played videos, or other content that needs to be stored.

In some embodiments, the VR device 10 may be configured to play VR scenes such as pictures, videos, and three-dimensional space models. The pictures and videos may be panoramic pictures or videos or three-dimensional space scenes that are all built by models. Alternatively, the VR device 10 may be used to play a frame obtained by splicing a three-dimensional space scene and a two-dimensional video.

Figure 2:
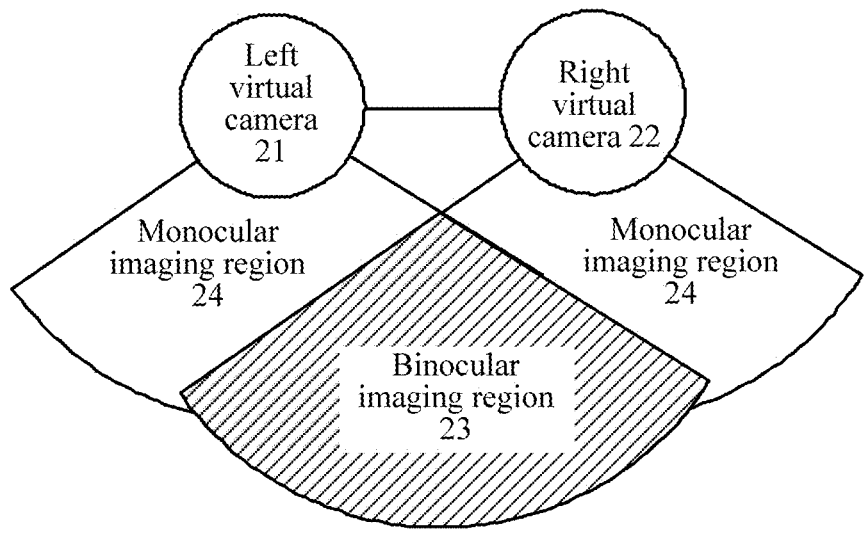
FIG. 2 is a schematic diagram of a three-dimensional space scene according to an embodiment of this application.

FIG. 2 is a schematic diagram of a virtual three-dimensional space scene according to an embodiment of this application. As shown in FIG. 2, the virtual three-dimensional space scene includes the followings:

A left virtual camera 21 and a right virtual camera 22 are configured to simulate a left eye and a right eye of a user.

A binocular imaging region 23 is a view angle overlapped region of the left virtual camera 21 and the right virtual camera 22. Due to a limited view angle of the eyes or the virtual cameras, only a visual region covered by the eyes has a binocular parallax. That is, the user can distinguish a distance of an object only in the binocular imaging region 23. Alternatively, the user can distinguish a depth of the object only in the binocular imaging region 23. It should be understood that, the three-dimensional space scene not only has a length attribute and a width attribute of a two-dimensional scene but also has a depth attribute. Alternatively, the object in the three-dimensional space scene may be distinguished to have a depth. For example, in the virtual three-dimensional space scene, coordinates x, y, and z are usually used to represent a length, a width, and a depth of the three-dimensional space scene respectively.

Monocular imaging regions 24 are other regions than the binocular imaging region 23 in the three-dimensional space scene. In the monocular imaging regions 24, the user cannot distinguish a distance of an object. Alternatively, the user cannot distinguish a depth of the object in the monocular imaging regions 24.

Figure 3:
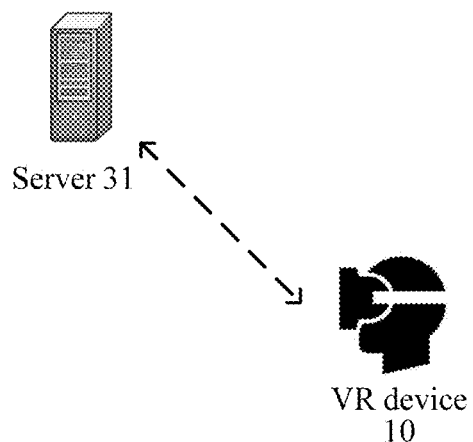
FIG. 3 is a schematic diagram of an application environment according to an embodiment of this application.

FIG. 3 is a schematic diagram of an application environment according to an embodiment of this application. As shown in FIG. 3, the application environment may include a server 31 and a VR device 10 that are in a communication connection. The server 31 may be a remote network server. The server 31 may further receive and store bullet screens sent by a plurality of terminal devices. The VR device 10 may obtain, from the server 31, the bullet screens sent by the plurality of terminal devices and play the bullet screens in a three-dimensional space scene through a display (for example, HMD 11) of the VR device 10. In some embodiments, the plurality of terminal devices may also include the VR device 10. For example, the server 31 may be a server for playing a network video or a network game. During a playing process of a network video or game, the server 31 may obtain, from the plurality of terminal devices, bullet screens about the network video or game sent by various users, and add the bullet screens sent by the various users for the network video or games to the network video or game to be displayed. The VR device 10 may obtain the bullet screens from the server 31 and play the same while playing the network video or game. In this embodiment of this application, a display rule for the server 31 to add the bullet screens to the network video or game is not limited. For example, the server 31 may determine time of adding a bullet screen to the network video according to time of sending the bullet screen by a user.

In this embodiment of this application, the manner for the VR device 10 to obtain a bullet screen is not limited. For example, the VR device 10 may obtain a bullet screen from the server 31. Alternatively, the VR device 10 may also download frames and bullet screens to be played to the storage unit of the VR device in advance, and then, obtain the bullet screens from the storage unit and play the same. In this embodiment of this application, specific types of the plurality of terminals are not limited. The plurality of terminal devices may include the VR device 10 and may also include other types of devices than the VR device 10. For example, the plurality of terminal devices may include an intelligent mobile phone, a tablet computer, a desktop computer, a notebook computer or a VR device 10.

Figure 4:
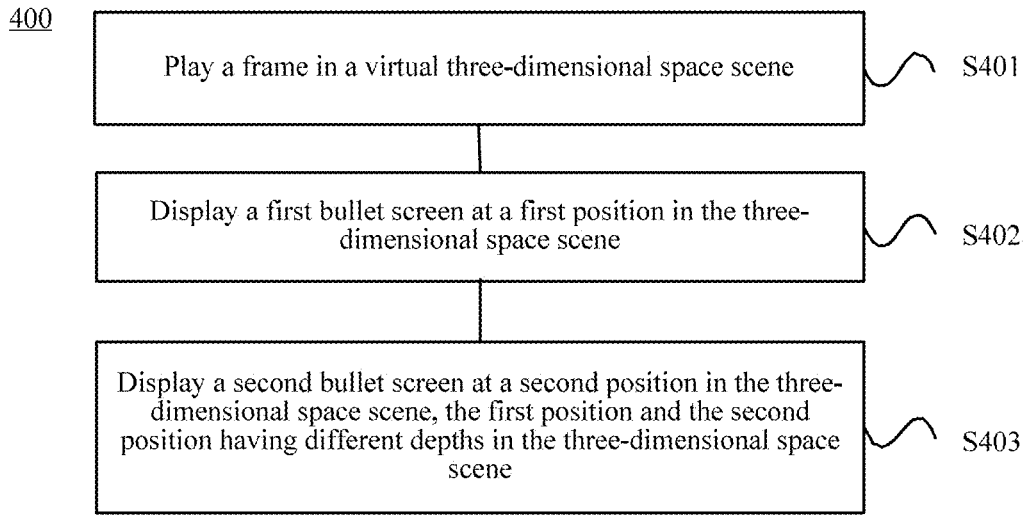
FIG. 4 is a schematic flowchart of a method for displaying a bullet screen according to an embodiment of this application.

FIG. 4 is a schematic flowchart of a method 400 for displaying a bullet screen according to an embodiment of this application. The method 400 is performed by the VR device 10 in FIG. 1. Alternatively, the method 400 may be performed by the calculation processing unit 13 in FIG. 1. Performing the method 400 by the VR device 10 is taken as an example to describe the method 400. As shown in FIG. 4, the method 400 includes the following steps:

S401: Play a frame in a virtual three-dimensional space scene.

For example, the VR device 10 may play the frame in the virtual three-dimensional space scene through a VR display (for example, HMD 11). The playing the frame in the virtual three-dimensional space scene may also be understood as playing a VR frame through the VR display.

In this embodiment of this application, the type and content of the frame are not specifically limited. The frame that is played in the three-dimensional space scene may include scenes such as pictures, videos, game scenes, and three-dimensional space models. The pictures and videos may be panoramic pictures or videos or three-dimensional space scenes that are all built by models. Alternatively, the frame that is played in the foregoing three-dimensional space scene may be a frame obtained by splicing a three-dimensional space scene and a two-dimensional video.

In this embodiment of this application, the manner for obtaining the frame is not limited. For example, the VR device 10 may obtain a frame from the server 31 that is in a communication connection with the VR device 10 and play the same. Alternatively, the VR device 10 may load a frame locally and play the same.

S402: Display a first bullet screen at a first position in the three-dimensional space scene.

S403: Display a second bullet screen at a second position in the three-dimensional space scene, the first position and the second position having different depths in the three-dimensional space scene.

It should be understood that, compared with a common two-dimensional scene, the three-dimensional space scene not only has a length attribute and a width attribute but also has a depth attribute. Alternatively, an object displayed in the three-dimensional space scene may be distinguished to have a depth.

Therefore, that the first position and the second position having different depths in the three-dimensional space scene means that coordinates of the first position and the second position in a depth direction in the three-dimensional space scene are different. Alternatively, the first position and the second position are not on the same plane in the three-dimensional space scene. Alternatively, it may also be understood that, the first bullet screen and the second bullet screen have depth attribute information, and the depth attribute information of the first bullet screen and the depth attribute information of the second bullet screen are different. The depth attribute information, for example, may include coordinate information of the bullet screens in a depth direction. For example, as a specific implementation, the depth coordinate information of the bullet screens may be set in a programming environment, so that the different bullet screens are displayed at positions having different depths in the virtual three-dimensional space scene.

It should be understood that, the first position and the second position described above and a third position to a sixth position described below are all positions in the virtual three-dimensional space scene. In other words, the first to sixth positions all have a coordinate in a length direction, a coordinate in a width direction, and a coordinate in a depth direction in the three-dimensional space scene.

As a specific example, the VR device 10 may obtain bullet screen data of the first bullet screen from the server 31 and display the first bullet screen according to the bullet screen data of the first bullet screen. The bullet screen data of the first bullet screen may include comment content and attribute information of the bullet screen. The attribute information of the bullet screen may include comment time and display time of the bullet screen.

The first bullet screen and the second bullet screen may be different bullet screens or may be the same bullet screens. When the first bullet screen and the second bullet screen are the same bullet screens, the first bullet screen may be located at the first position and the second position at different moments, and the first position and the second position having different depths in the three-dimensional space scene. For example, when the VR device 10 configures a manner for displaying the first bullet screen, a display track of the first bullet screen in the three-dimensional space scene may be set, and the display track may pass through positions (for example, the first position and the second position) having different depths in the three-dimensional space scene. Therefore, the first bullet screen may be located at positions having different depths in the three-dimensional space scene at different moments.

The first bullet screen and the second bullet screen are at different depths in the three-dimensional space scene, and may be displayed distinguishingly at positions having different depths in the three-dimensional space scene, to enhance readability of the bullet screens and optimize reading experience of users.

In some embodiments, the first bullet screen and the second bullet screen may be bullet screens associated with a frame played in the three-dimensional space scene. For example, when the played frame is a TV program, the first bullet screen and the second bullet screen may be comment made by a user on the TV program. For example, when the played frame is a network game, the first bullet screen and the second bullet screen may be comment made by a user on the game.

In this embodiment of this application, positions of frames and the bullet screen (for example, the first bullet screen and the second bullet screen) played in the three-dimensional space scene are not limited. The display position of the bullet screen and the position of the played frame may be at different depths. For example, the frame played in the three-dimensional space scene may include at least one display object. When the frame includes a plurality of display objects, the depth coordinates of the plurality of display objects in the three-dimensional space scene may be different. The display position (for example, the first position or the second position) of the bullet screen and each of the display objects may be at different depths. Alternatively, the display position of the bullet screen and a certain display object among the plurality of display objects may also be at the same depth. As a specific example, the frame played in the three-dimensional space scene may include mountain and a horse, and the display positions of the mountain and the horse may be at different depths in the three-dimensional space scene. The depth of the display position of the bullet screen may be the same as the depth of the display positions of the mountain or horse, or between the depth of the display positions of the mountain or horse, or any other depth in the three-dimensional space scene.

In this embodiment of this application, when the frame is played in the virtual three-dimensional space scene, different bullet screens may be displayed at positions having different depths in the three-dimensional space scene to be distinguished better, to enhance the quality of displaying bullet screens in the VR system, enhance reading experience of users, efficiently utilize hardware and network resources of the server and the VR device, and implement more abundant functions.

This embodiment of this application includes a plurality of bullet screen displaying rules.

For example, as a feasible bullet screen displaying rule, in the method 400, if a distance in a depth direction between the first position and a user view angle is greater than a distance in the depth direction between the second position and the user view angle, a font size of the first bullet screen may be set to be greater than a font size of the second bullet screen; a repeated playing speed of the first bullet screen may be set to be greater than a repeated playing speed of the second bullet screen; or a text contrast ratio of the first bullet screen may be set to be less than a text contrast ratio of the second bullet screen.

Figure 6:
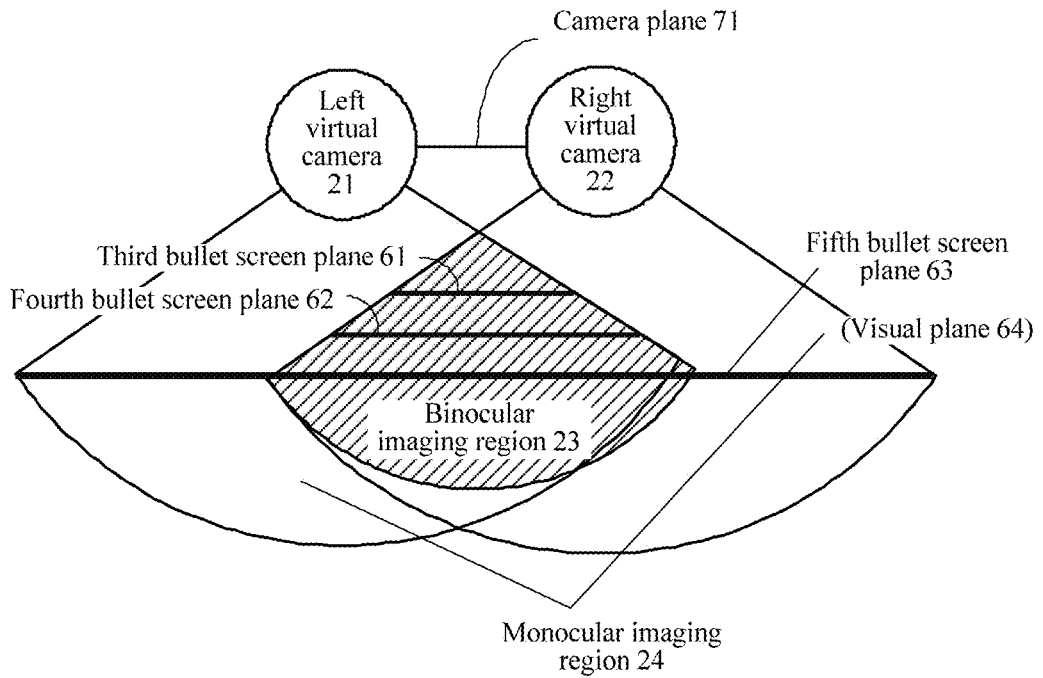
FIG. 6 is a schematic diagram of a three-dimensional space scene according to still another embodiment of this application.

The user view angle may refer to a position of an eye of a user in the virtual three-dimensional space scene. In other words, the user view angle may refer to a position of a left or right virtual camera in the three-dimensional space scene. For example, as shown in FIG. 6, the user view angle may be at a position where the left virtual camera 21 or the right virtual camera 22 is located. Alternatively, the user view angle may be located on a plane where a camera plane 71 in FIG. 6 is located. The camera plane 71 may be a plane where the left virtual camera 21 and the right virtual camera plane 22 are located.

As an example, the text contrast ratio may be a ratio of text to background.

In some embodiments, the three-dimensional space scene includes a binocular imaging region 23 and a monocular imaging region 24, bullet screens displayed in the binocular imaging region 23 are located at positions having different depths in the three-dimensional space scene and bullet screens displayed in the monocular imaging region 24 are located at positions having the same depth in the three-dimensional space scene.

In some embodiments, the bullet screens displayed in the binocular imaging region are located on a binocular bullet screen plane, and the binocular bullet screen plane is located between a plane of the user view angle and a visual plane and is parallel to the visual plane; and the bullet screens displayed in the monocular imaging region are located on a monocular bullet screen plane, and the monocular bullet screen plane is overlapped with the visual plane. The visual plane is a plane at a position where an optimal sight distance is located.

In some embodiments, an area of the monocular bullet screen plane is less than an area of the visual plane, and an area of the binocular bullet screen plane is less than an area of the monocular bullet screen plane; and when the binocular imaging region includes at least the two binocular bullet screen planes, if the binocular bullet screen planes are deeper, the binocular bullet screen planes have a larger area.

In this embodiment of this application, in the three-dimensional space scene, bullet screens are displayed at positions having different depths in the binocular imaging region 23, and bullet screens are displayed at positions having the same depth in the monocular imaging region 24, to facilitate a user to distinguish different bullet screens better, enhance the quality of displaying bullet screens in the VR system, enhance reading experience of users, efficiently utilize hardware and network resources of the server and the VR device, and implement more abundant functions.

In some embodiments, the method 400 further includes: obtaining a fixation point of a user; selecting a target bullet screen located at the fixation point from bullet screens of the three-dimensional space scene; and changing a display mode of the target bullet screen.

As a specific example, the VR device 10 may obtain a real-time fixation point of a user through the track system unit 12 or the eyeball track unit 14 in the HMD 11, then selects a target bullet screen located at the real-time fixation point from bullet screens of the three-dimensional space scene, and change a display mode of the target bullet screen, so that the user can read the target bullet screen conveniently. In a situation that the eyeball track unit 14 of the HMD 11 is used, the fixation point may be associated with an eyeball direction $(1, \theta, \varphi)$ of the user, to obtain a position of the real-time fixation point, thereby reducing unnecessary head turning actions.

In this embodiment of this application, the fixation point of the user is obtained and the display mode of the target bullet screen located at the fixation point is changed, to facilitate the user to distinguish the target bullet screen from other bullet screens better, enhance the quality of displaying bullet screens in the VR system, enhance reading experience of users, efficiently utilize hardware and network resources of the server and the VR device, and implement more abundant functions.

For example, as a specific example, the VR device 10 may obtain, from the server 31, information such as text of a bullet screen, sending time of the bullet screen, and information of a user sending the bullet screen. In some embodiments, the VR device 10 may also obtain the depth information of the bullet screen from the server 31. Then, the VR device 10 may detect the real-time fixation point of the user, and according to the real-time fixation point of the user, determine a region (for example, the monocular imaging region 24 or the binocular imaging region 23) in the three-dimensional space scene where the bullet screen is displayed. The VR device 10 may set the track of the bullet screen on different planes from the virtual camera based on a certain rule according to the time information corresponding to each bullet screen, to display the text of the bullet screen, for example, display the bullet screen on the monocular bullet screen plane or the binocular bullet screen plane according to the preset rule and the time information corresponding to each bullet screen.

In this embodiment of this application, according to the real-time fixation point of the user, a region in the three-dimensional space scene corresponding to the real-time fixation point of the current user is calculated, a region in the three-dimensional space scene where the bullet screen is displayed is determined according to the real-time fixation point of the user. In addition, in this embodiment of this application, according to the time point of the bullet screen, the attribute of the user sending the bullet screen, and the depth information, the bullet screens are displayed on planes having different depths, to emphasize or weaken different bullet screen information and enhance flexibility of displaying a bullet screen. In this embodiment, the user attribute includes priority information of the user.

In some embodiments, the display mode of the target bullet screen may be changed in a plurality of manners. For example, the following lists some manners in which the display mode of the target bullet screen is changed.

As a specific example, a display position of the target bullet screen in the three-dimensional space scene is changed from a third position to a fourth position, a distance in a depth direction between the fourth position and a user view angle is less than a distance in the depth direction between the third position and the user view angle. In other words, the target bullet screen may be changed to a position closer to the user view angle, so that the user can read the content of the target bullet screen conveniently.

As another specific example, the repeated playing speed of the target bullet screen may be reduced.

As another specific example, a contrast ratio of the target bullet screen to the background may be increased. For example, Gaussian blur processing is performed on the background.

As another specific example, the font size of the target bullet screen may be increased.

In some embodiments, the method 400 further includes: displaying a third bullet screen based on a first preset track in the three-dimensional space scene. The first preset track passes through a fifth position and a sixth position, and the fifth position and the sixth position have different depths in the three-dimensional space scene. In other words, in a situation that the VR device 10 displays the third bullet screen through the VR display, the third bullet screen may pass through positions having different depths in the three-dimensional space scene during a playing process. For example, when the third bullet screen passes through the monocular imaging region 24, the third bullet screen may be played repeatedly at a position having a first depth, and when the third bullet screen passes through the binocular imaging region 23, the third bullet screen may be played repeatedly at a position having a second depth.

Furthermore, the sixth position is located on the monocular bullet screen plane; the sixth position is located on the binocular bullet screen plane; and a depth of the monocular bullet screen plane is greater than a depth of the binocular bullet screen plane. When the third bullet screen passes through a projection region of the binocular bullet screen plane on the monocular bullet screen plane, if a quantity of bullet screens on the binocular bullet screen plane does not reach a preset value, the third bullet screen is switched to be displayed on the binocular bullet screen plane.

Figure 5:
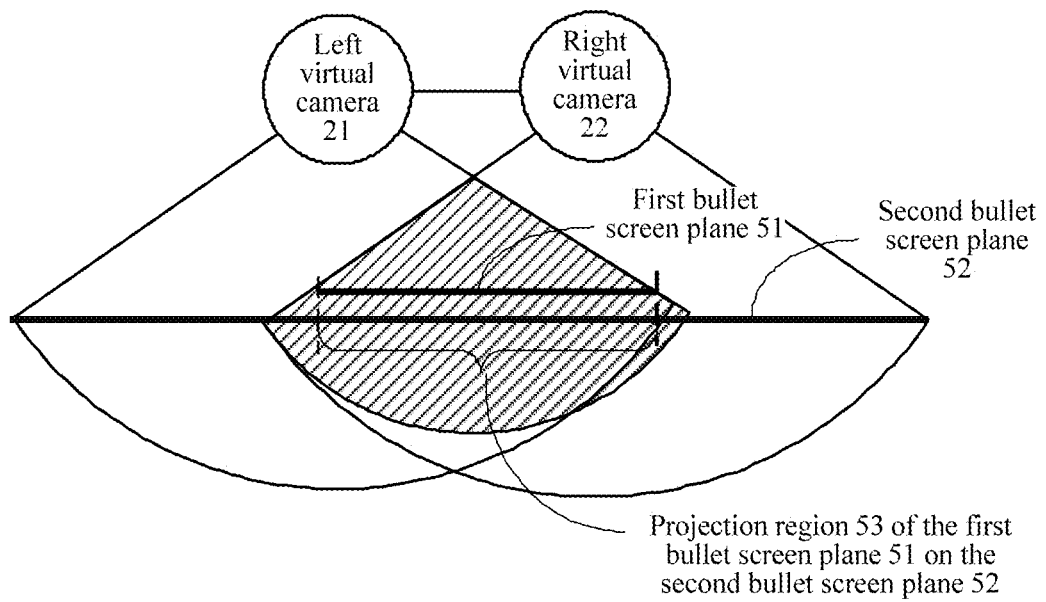
FIG. 5 is a schematic diagram of a method for displaying a bullet screen according to still another embodiment of this application.

As a specific example, FIG. 5 is a schematic diagram of a method for displaying a bullet screen according to an embodiment of this application. As shown in FIG. 5, a plurality of bullet screen planes may be set in the three-dimensional space scene and may be parallel planes. The bullet screens may be played on the plurality of bullet screen planes, and the depths of the positions where the bullet screens are played on each of the bullet screen planes are the same. FIG. 5 shows a first bullet screen plane 51 and a second bullet screen plane 52. The first bullet screen plane 51 and the second bullet screen plane 52 may be planes located at positions parallel to the user view angle. The first bullet screen plane 51 is closer to the user view angle and the second bullet screen plane 52 has a projection region 53 of the first bullet screen plane 51. The third bullet screen may be configured to be played repeatedly from one side of the three-dimensional space scene to the other side. If the third bullet screen passes through a projection region (for example, the projection region 53) of a front bullet screen plane (for example, the first bullet screen plane 51) on a current bullet screen plane (for example, the second bullet screen plane 52) and a quantity of bullet screens on the front bullet screen plane does not reach a preset threshold, the third bullet screen may be switched to be played on the front bullet screen plane.

In this embodiment of this application, the depths of the positions through which the first preset track of the third bullet screen passes are different in the three-dimensional space scene, to facilitate users to read the third bullet screen better, enhance the quality of displaying bullet screens in the VR system, enhance reading experience of users, efficiently utilize hardware and network resources of the server and the VR device, and implement more abundant functions.

In some embodiments, in the method 400, the three-dimensional space scene includes a binocular imaging region 23 and a monocular imaging region 24, bullet screens displayed in the binocular imaging region 23 are located at positions having different depths in the three-dimensional space scene and bullet screens displayed in the monocular imaging region 24 are located at positions having the same depth in the three-dimensional space scene.

Specifically, human eyes can distinguish a distance of an object in the binocular imaging region 23, but cannot distinguish a distance of an object in the monocular imaging region 24. Therefore, bullet screens may be displayed at positions having different depths in the binocular imaging region 23, and bullet screens may be displayed at positions having the same depth in the monocular imaging region 24, to optimize reading experience of users, efficiently utilize hardware and network resources of the server and the VR device, and implement more abundant functions.

Figure 7:
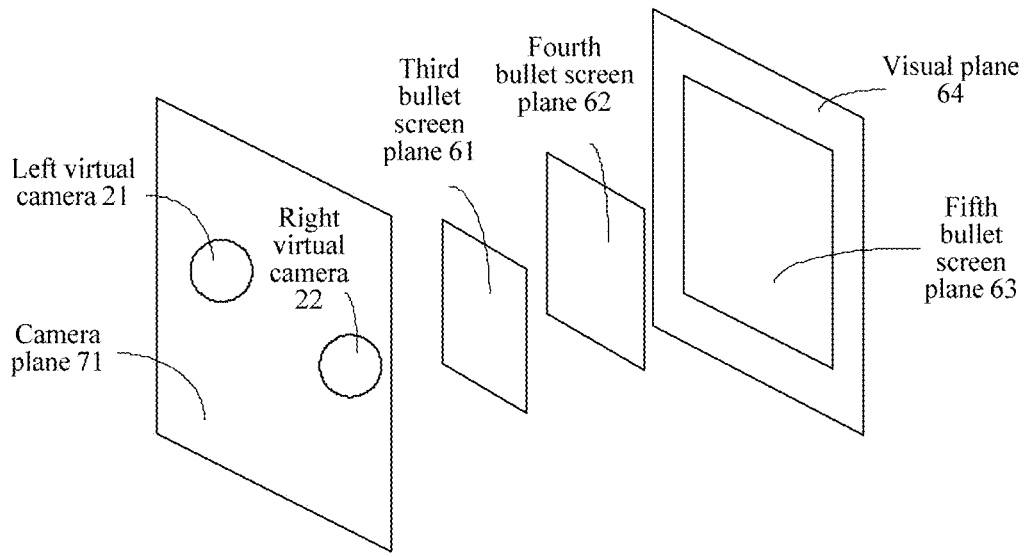
FIG. 7 is a schematic diagram of a three-dimensional space scene according to still another embodiment of this application.

With reference to FIG. 6 and FIG. 7, a specific example of the method for displaying a bullet screen in this embodiment of this application is introduced. FIG. 6 and FIG. 7 show the scene for displaying a bullet screen from different angles (a top view and a side view). The method for displaying a bullet screen in FIG. 6 and FIG. 7 includes the following portion.

In a first portion, the VR device 10 obtains real-time bullet screen data from the server 31, the bullet screen data may include comment content and comment time, the bullet screen data may include information of a user sending the bullet screen or depth information of the bullet screen. The user information of the bullet screen may include priority information of the user. It should be understood that, the depth information of the bullet screen may be obtained from the server 31 or may not be obtained from the server 31, and the VR device 10 determines the depth information of the bullet screen.

In a second portion, the VR device 10 may obtain a three-dimensional space position (x, y, z) of a user head at current time and an orientation (α, β, γ) of a visual field of the user head, and calculate a current visual plane 64 according to built-in parameters of the VR system. For example, the built-in parameters of the VR system may include Field of Vision (FOV), an optimal sight distance, and so on.

The visual plane 64 may be a plane of a position where the optimal sight distance of the user is located. Alternatively, the visual plane 64 may also be a plane determined according to other parameters.

For example, usually, an empirical value of the optimal sight distance is 2.5 m, or another empirical value may also be used. Specific data will not influence the calculation method.

For example, an empirical value of the FOV may be set to be 90°, or another empirical value may also be used. Specific data will not influence the calculation method.

In a third portion, the VR device 10 may determine a plurality of bullet screen planes. The plurality of bullet screens may be used to display the bullet screen. For example, the plurality of bullet screens may be located at positions between the visual plane 64 and a virtual camera (including the left virtual camera 21 and the right virtual camera 22). Alternatively, the visual plane 64 may also be used as a bullet screen plane. The plurality of bullet screens may be parallel to the visual plane 64.

The determining a plurality of bullet screen planes may include determining lengths, widths, and depths of the plurality of bullet screen planes in the three-dimensional space scene and three-dimensional coordinates of each point on the plurality of bullet screen planes in the three-dimensional space scene. For example, in the binocular imaging region 23, according to a certain distance rule, a series of bullet screen planes are placed at positions having different depths from the left and right virtual cameras. The distance rule may be a fixed distance spacing in a depth direction or another distance rule may be used, and the distance rule is not specifically limited in this embodiment of this application.

In some embodiments, since the user cannot distinguish depths in the monocular imaging region 24, one bullet screen plane may be set in the monocular imaging region 24, and the bullet screen plane may be called as a monocular bullet screen plane. However, since the user can distinguish different depths in the binocular imaging region 23, a plurality of bullet screen planes may be set in the binocular imaging region 23, and the bullet screen planes disposed in the binocular imaging region 23 may be called as binocular bullet screen planes.

Since the depths of the plurality of bullet screen planes in the three-dimensional space scene are different, if the bullet screens are displayed on the different bullet screen planes, the depths of the bullet screens are also different. For example, in the method 400, the first bullet screen may be displayed on a third bullet screen plane 61 in FIG. 6, and the second bullet screen may be displayed on a fourth bullet screen plane 62 in FIG. 6. In other words, the first position where the first bullet screen is displayed is located on the third bullet screen plane 61 and the second position where the second bullet screen is displayed is located on the fourth bullet screen plane 62. Therefore, the depths of the first position and the second position are different.

Further, for example, in the method 400, when the target bullet screen where the fixation point of the user is located is detected, the display position of the target bullet screen in the three-dimensional space scene may be changed from the third position to the fourth position, the third position may be located on the fourth bullet screen plane 62 in FIG. 6, the fourth position may be located on the third bullet screen plane 61 in FIG. 6. Therefore, the fourth position is closer to the camera plane 71 than the third position in a depth direction. Alternatively, from the user view angle, the fourth position is closer to the left and right virtual cameras characterizing the eyes of the user than the third position.

Furthermore, for example, in the method 400, the third bullet screen is displayed based on the first preset track in the three-dimensional space scene, and the first preset track passes through the fifth position and the sixth position. The third bullet screen may be played repeatedly from one side of the three-dimensional space scene to the other side. Being played repeatedly means that a bullet screen is moved and displayed along a preset track at a predetermined time interval in the three-dimensional space scene. For example, the third bullet screen may be first played repeatedly through the fifth bullet screen plane 63 in FIG. 6, and when the third bullet screen passes through the projection region of the fourth bullet screen plane 62 on the fifth bullet screen plane 63, the third bullet screen may be switched to the fourth bullet screen plane 62 to be played repeatedly. Thus, the fifth position may be located on the fifth bullet screen plane 63 and the sixth position may be located on the fourth bullet screen plane 62. Therefore, the fifth position and the sixth position have different depths in the three-dimensional space scene.

It should be noted that, the same bullet screen may not be limited to be played in a range of the same bullet screen plane. The playing track of the same bullet screen may pass through different bullet screen planes. For example, the first bullet screen may pass through the third bullet screen plane 61 and the fourth bullet screen plane 62 when being played repeatedly.

In some embodiments of this application, the eyeball track technology may be further used to display a bullet screen according to an eyeball direction (1, θ, φ) of a user. Specifically, content of a fourth portion and a fifth portion may be included.

In the fourth portion, the eyeball direction (1, θ, φ) of the user at current time is obtained through the eyeball track device on the HMD 11.

In the fifth portion, based on the eyeball direction (1, θ, φ) of the user and some parameter information (for example, FOV information), the binocular imaging region 23 in the eyeball direction is obtained. In the binocular imaging region 23, according to a certain distance rule, a series of binocular bullet screen planes are placed at positions having different depths from the left and right virtual cameras. For example, the distance rule may be a fixed distance spacing in a depth direction or another distance rule may be used, and the distance rule is not specifically limited in this embodiment of this application.

FIG. 6 and FIG. 7 respectively show a positional relationship of the camera plane 71, the bullet screen planes, and the visual plane 64 from different angles. The camera plane 71 is a plane where the left and right virtual cameras are located. The bullet screen planes may include, for example, the third bullet screen plane 61, the fourth bullet screen plane 62, and the fifth bullet screen plane 63. As shown in FIG. 6, the binocular imaging region 23 and the monocular imaging region 24 may be obtained according to the view angles of the left and right virtual cameras and a geometric relationship. In the binocular imaging region 23, a plurality of bullet screen planes with different areas may be obtained according to a set quantity and the distance spacing of bullet screen planes. The quantity of the bullet screen planes and the distance spacing may be defined according to a user demand. For example, the bullet screen planes in FIG. 6 and FIG. 7 may include the third bullet screen plane 61, the fourth bullet screen plane 62, and the fifth bullet screen plane 63. It should be noted that, as an example, the visual plane 64 may also include a bullet screen plane (for example, the fifth bullet screen plane 63). Alternatively, the visual plane 64 may not be used as a bullet screen plane. In some embodiments, an area of the fifth bullet screen plane 63 may be the same as or less than that of the visual plane 64. The visual plane 64 may be a plane of a position where the optimal sight distance of the user is located. The optimal sight distance may be determined according to the parameters of the VR system. In FIG. 6 and FIG. 7, the third bullet screen plane 61 and the fourth bullet screen plane 62 are located in the binocular imaging region 23. Some regions of the fifth bullet screen plane 63 are located in the monocular imaging region 24 and the other regions are located in the binocular imaging region 23. A bullet screen plane may be set in the monocular imaging region 24. Alternatively, in the monocular imaging region 24, the bullet screens may be displayed at positions having the same depth.

In this embodiment of this application, the areas of the bullet screen planes are not limited. For example, the area of a bullet screen plane may be set to increase as a distance between the bullet screen plane and the camera plane 71 increases. Alternatively, the areas of each of the bullet screen planes may be set to be the same.

In some embodiments of this application, a bullet screen plane is taken as an example to describe a display mode of a bullet screen. It should be noted that, displaying a bullet screen by using a bullet screen plane is only an exemplary expression manner. In this embodiment of this application, the display track of the bullet screen may not be limited to display on the bullet screen plane. The bullet screen may also be displayed according to any track in the three-dimensional space scene.

In a sixth portion, the VR device 10 may project a bullet screen on a bullet screen plane to be displayed according to a preset rule and bullet screen data obtained from the server 31.

In this embodiment of this application, the preset rule for displaying a bullet screen is not limited. As a specific example, assuming that the first bullet screen plane 51 and the second bullet screen plane 52 are any two bullet screen planes for displaying bullet screens in the three-dimensional space scene and a distance between the first bullet screen plane 51 and the camera plane is less than a distance between the second bullet screen plane 52 and the camera plane, then, a font size of bullet screens on the first bullet screen plane 52 may be set to be less than a font size of bullet screens on the second bullet screen plane 52, a repeated playing speed of the bullet screens on the first bullet screen plane 51 may be set to be less than a repeated playing speed of the bullet screens on the second bullet screen plane 52, or a text contrast ratio of the bullet screens on the first bullet screen plane 51 may be set to be greater than a text contrast ratio of the bullet screens on the second bullet screen plane 52.

In this embodiment of this application, the preset rule for the VR device 10 to project bullet screens is not limited. As a specific example, the following several projection rules may be set.

Random uniform distribution principle. That is, all bullet screens are projected onto a plurality of bullet screen planes randomly and uniformly.

User level priority principle. That is, a bullet screen sent by a user having a higher level may be first displayed on a bullet screen plane closer to a virtual camera.

Principle of repeated display and automatic advance. That is, a bullet screen may appear from one side of a bullet screen plane that is farthest from the virtual camera and be played repeatedly toward the other side of the bullet screen plane. If the bullet screen passes through a projection region of a front bullet screen plane on the current bullet screen plane and a quantity of bullet screens on the front bullet screen plane does not reach an upper limit, the bullet screen may be switched to be displayed repeatedly on the front bullet screen plane.

In a seventh portion, the VR device 10 may obtain a fixation point of a user by using the eyeball track unit 14, select a bullet screen according to the fixation point of the user, and change a display mode of the bullet screen, to optimize display of the bullet screen.

As a specific example, each bullet screen is corresponding to a selection response region. When the fixation point of the user is determined to fall on a certain bullet screen, the bullet screen or neighboring bullet screens are optimized and displayed. The method for optimizing and displaying includes a plurality of manners. The selection response region may refer to a collision heat region of each bullet screen, the fixation point of an eye is also a selector, and when the selector enters the collision heat region, a response is triggered. For example, if the selected bullet screen is not on a nearest bullet screen plane, the bullet screen may be advanced to the nearest bullet screen plane. Alternatively, Gaussian blur processing is performed on the background of the bullet screen, to increase a text contrast ratio. Alternatively, the repeated playing speed of the bullet screen may be reduced.

The apparatus for displaying a bullet screen according to an embodiment of this application is described in detail below with reference to the accompanying drawings.

Figure 8:
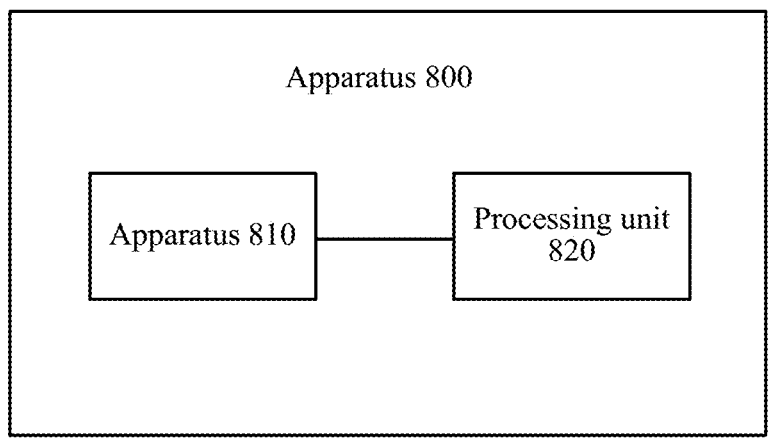
FIG. 8 is a schematic diagram of an apparatus according to still another embodiment of this application.

FIG. 8 is a schematic diagram of an apparatus 800 for displaying a bullet screen according to an embodiment of this application. The apparatus 800 may include the calculation processing unit 13 in FIG. 1, or the apparatus 800 may also include the VR device 10 in FIG. 1. As shown in FIG. 8, the apparatus 800 includes a playing unit 810 and a processing unit 820.

The playing unit 810 is configured to play a frame in a virtual three-dimensional space scene. The processing unit 820 is configured to display a first bullet screen at a first position in the three-dimensional space scene; and display a second bullet screen at a second position in the three-dimensional space scene, the first position and the second position having different depths in the three-dimensional space scene.

In this embodiment of this application, when the frame is played in the virtual three-dimensional space scene, different bullet screens may be displayed at positions having different depths in the three-dimensional space scene to be distinguished better, to enhance the quality of displaying bullet screens in the VR system, enhance reading experience of users, efficiently utilize hardware and network resources of the server and the VR device, and implement more abundant functions.

As an example, in the apparatus 800, the processing unit 820 is further configured to obtain a fixation point of a user; select a target bullet screen located at the fixation point from bullet screens of the three-dimensional space scene; and change a display mode of the target bullet screen.

As an example, in the apparatus 800, for the changing a display mode of the target bullet screen, the processing unit 820 is specifically configured to change a display position of the target bullet screen in the three-dimensional space scene from a third position to a fourth position. A distance in a depth direction between the fourth position and a user view angle is less than a distance in the depth direction between the third position and the user view angle.

As an example, in the apparatus 800, a distance in a depth direction between the first position and a user view angle is greater than a distance in the depth direction between the second position and the user view angle, a font size of the first bullet screen is greater than a font size of the second bullet screen; a repeated playing speed of the first bullet screen is greater than a repeated playing speed of the second bullet screen; or a text contrast ratio of the first bullet screen is less than a text contrast ratio of the second bullet screen.

As an example, in the apparatus 800, the processing unit 820 is further configured to: display a third bullet screen based on a first preset track in the three-dimensional space scene. The first preset track passes through a fifth position and a sixth position, and the fifth position and the sixth position have different depths in the three-dimensional space scene.

As an example, in the apparatus 800, the three-dimensional space scene includes a binocular imaging region 23 and a monocular imaging region 24, bullet screens displayed in the binocular imaging region 23 are located at positions having different depths in the three-dimensional space scene and bullet screens displayed in the monocular imaging region 24 are located at positions having the same depth in the three-dimensional space scene.

Figure 9:
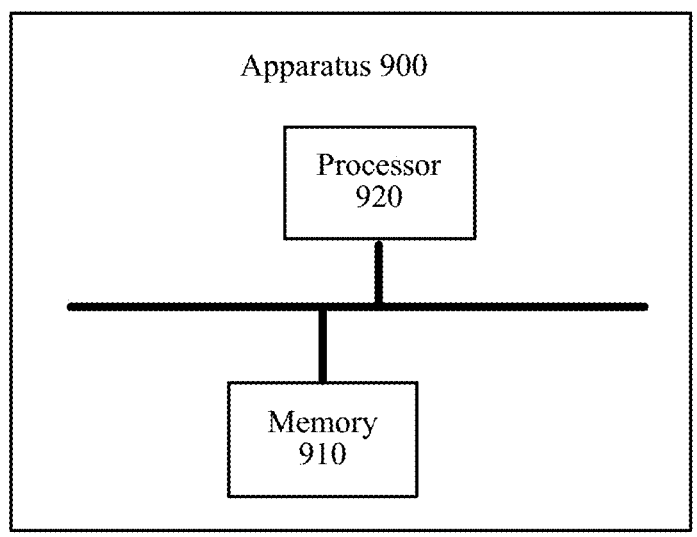
FIG. 9 is a schematic diagram of an apparatus according to still another embodiment of this application.

FIG. 9 is a schematic diagram of an apparatus for displaying a bullet screen according to an embodiment of this application. The apparatus 900 may include the calculation processing unit 13 described above. Alternatively, the apparatus 900 may include the VR device 10 in FIG. 1. The apparatus 900 may include an intelligent mobile phone, a tablet computer, a desktop computer, a notebook computer, or another intelligent device that can perform calculation.

The apparatus 900 in FIG. 9 includes:

a memory 910, configured to store a program; and a processor 920, connected to the memory 910 and a display respectively, and configured to execute the program stored in the memory, where when the program is being executed, the processor is configured to play, through the display, a frame in a virtual three-dimensional space scene; display, through the display, a first bullet screen at a first position in the three-dimensional space scene; and display, through the display, a second bullet screen at a second position in the three-dimensional space scene, the first position and the second position have different depths in the three-dimensional space scene.

In this embodiment of this application, when the frame is played in the virtual three-dimensional space scene, different bullet screens may be displayed at positions having different depths in the three-dimensional space scene to be distinguished better, to enhance the quality of displaying bullet screens in the VR system, enhance reading experience of users, efficiently utilize hardware and network resources of the server and the VR device, and implement more abundant functions.

In some embodiments, the display may be a device for displaying a VR frame. For example, the display may be the HMD 11 in FIG. 1. The display may be disposed in the apparatus 900 and may also be an independent device. When the display is an independent device, the display and the apparatus 900 may be connected in a wired or wireless manner.

As an example, the apparatus 900 may include the display.

As an example, in the apparatus 900, the processor 920 is further configured to obtain a fixation point of a user; select a target bullet screen located at the fixation point from bullet screens of the three-dimensional space scene; and change a display mode of the target bullet screen through the display 910.

As an example, in the apparatus 900, for the changing a display mode of the target bullet screen, the processor 920 is specifically configured to change, through the display 910, a display position of the target bullet screen in the three-dimensional space scene from a third position to a fourth position. A distance in a depth direction between the fourth position and a user view angle is less than a distance in the depth direction between the third position and the user view angle.

As an example, in the apparatus 900, a distance in a depth direction between the first position and a user view angle is greater than a distance in the depth direction between the second position and the user view angle, a font size of the first bullet screen is greater than a font size of the second bullet screen; a repeated playing speed of the first bullet screen is greater than a repeated playing speed of the second bullet screen; or a text contrast ratio of the first bullet screen is less than a text contrast ratio of the second bullet screen.

As an example, in the apparatus 900, the processor 920 is further configured to: display, through the display 910, a third bullet screen based on a first preset track in the three-dimensional space scene. The first preset track passes through a fifth position and a sixth position, and the fifth position and the sixth position have different depths in the three-dimensional space scene.

As an example, in the apparatus 900, the three-dimensional space scene includes a binocular imaging region 23 and a monocular imaging region 24, bullet screens displayed in the binocular imaging region 23 are located at positions having different depths in the three-dimensional space scene and bullet screens displayed in the monocular imaging region 24 are located at positions having the same depth in the three-dimensional space scene.

A person of ordinary skill in the art may know that, the units and algorithm steps of each example described in the embodiments can be implemented by electronic hardware or a combination of computer software and electronic hardware. Whether the functions are implemented by hardware or software depends on a specific application and a design constraint condition of a technical solution. A professional technician may uses a different method for each specific application to implement described functions, but such implementation should not be considered to exceed the scope of this application.

It may be clearly understood by a person skilled in the art that for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit.

If the function is implemented in the form of a software functional unit and sold or used as an independent product, the function may be stored in a computer-readable storage medium. Based on such an understanding, the technical solutions of this application essentially, or the part contributing to the existing technology, or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash memory drive, a removable hard disk, a read-only memory (ROM), a random access memory (RAM), a magnetic disk, or an optical disc.

The descriptions are only specific implementations of this application, but are not intended to limit the protection scope of this application. Any variation or replacement readily figured out by any person skilled in the art within the technical scope disclosed in this application shall fall within the protection scope of this application. Therefore, the protection scope of this application shall be subject to the appended claims.

What is claimed is:

1. A method for displaying a bullet screen, applicable for a Virtual Reality (VR) device, the method comprising:
   rendering a virtual three-dimensional space scene using the VR device;
   displaying a frame in the virtual three-dimensional space scene;
   defining a first position and a second position, the first position and the second position having different visual depths in the three-dimensional space scene;
   displaying a first bullet screen at at least one of the first position and the second position in the three-dimensional space scene.

2. The method according to claim 1, further comprising:
   obtaining a fixation point;
   selecting a target bullet screen located at the fixation point from bullet screens of the three-dimensional space scene; and
   changing a display mode of the target bullet screen.

3. The method according to claim 2, wherein the changing a display mode of the target bullet screen comprises:
   changing a display position of the target bullet screen in the three-dimensional space scene from a third position to a fourth position, a distance in a depth direction between the fourth position and a user view angle being less than a distance in the depth direction between the third position and the user view angle, wherein the user view angle is a virtual position.

4. The method according to claim 1, wherein a distance in the depth direction between the first position and the user view angle is greater than a distance in the depth direction between the second position and the user view angle, wherein:
   a font size of the first bullet screen is greater than a font size of the second bullet screen;
   a repeated playing speed of the first bullet screen is greater than a repeated playing speed of the second bullet screen; or
   a text contrast ratio of the first bullet screen is less than a text contrast ratio of the second bullet screen.

5. The method according to claim 1, wherein the three-dimensional space scene comprises a binocular imaging region and a monocular imaging region, bullet screens displayed in the binocular imaging region are located at positions having different depths in the three-dimensional space scene and bullet screens displayed in the monocular imaging region are located at positions having the same depth in the three-dimensional space scene.

6. The method according to claim 5, wherein the bullet screens displayed in the binocular imaging region are located on a binocular bullet screen plane, and the binocular bullet screen plane is located between a plane of the user view angle and a visual plane and is parallel to the visual plane; and
   the bullet screens displayed in the monocular imaging region are located on a monocular bullet screen plane, and the monocular bullet screen plane is overlapped with the visual plane.

7. The method according to claim 6, wherein the visual plane is a plane at a position where an optimal sight distance is located.

8. The method according to claim 6, wherein an area of the monocular bullet screen plane is less than an area of the visual plane, and an area of the binocular bullet screen plane is less than an area of the monocular bullet screen plane; and
   when the binocular imaging region comprises at least two binocular bullet screen planes, if the binocular bullet screen plane is deeper, the binocular bullet screen planes has a larger area.

9. The method according to claim 1, further comprising:
   displaying a third bullet screen based on a first preset track in the three-dimensional space scene, the first preset track passes through a fifth position and a sixth position, and the fifth position and the sixth position have different depths in the three-dimensional space scene.

10. The method according to claim 9, wherein the fifth position is located on the monocular bullet screen plane; the sixth position is located on the binocular bullet screen plane; and a depth of the monocular bullet screen plane is greater than a depth of the binocular bullet screen plane; and
    the method further comprises: switching the third bullet screen to be displayed on the binocular bullet screen plane if a quantity of bullet screens on the binocular bullet screen plane does not reach a preset value when the third bullet screen passes through a projection region of the binocular bullet screen plane on the monocular bullet screen plane.

11. A Virtual Reality (VR) apparatus for displaying a bullet screen, comprising: a memory and a processor, the memory storing computer-readable instructions, and the processor executing the computer-readable instructions in the memory to perform the following operations:

rendering a virtual three-dimensional space scene using the VR device;

displaying a frame in the virtual three-dimensional space scene;

defining a first position and a second position, the first position and the second position having different visual depths in the three-dimensional space scene; and displaying a first bullet screen at at least one of the first position and the second position in the three-dimensional space scene.

12. The VR apparatus according to claim 11, wherein the operations further comprise:

obtaining a fixation point;

selecting a target bullet screen located at the fixation point from bullet screens of the three-dimensional space scene; and changing a display mode of the target bullet screen.

13. The VR apparatus according to claim 12, wherein the changing a display mode of the target bullet screen comprises:

changing a display position of the target bullet screen in the three-dimensional space scene from a third position to a fourth position, a distance in a depth direction between the fourth position and a user view angle being less than a distance in the depth direction between the third position and the user view angle, wherein the user view angle is a virtual position.

14. The VR apparatus according to claim 11, wherein a distance in the depth direction between the first position and the user view angle is greater than a distance in the depth direction between the second position and the user view angle, wherein:

a font size of the first bullet screen is greater than a font size of the second bullet screen;

a repeated playing speed of the first bullet screen is greater than a repeated playing speed of the second bullet screen; or a text contrast ratio of the first bullet screen is less than a text contrast ratio of the second bullet screen.

15. The VR apparatus according to claim 11, wherein the three-dimensional space scene comprises a binocular imaging region and a monocular imaging region, bullet screens displayed in the binocular imaging region are located at positions having different depths in the three-dimensional space scene and bullet screens displayed in the monocular imaging region are located at positions having the same depth in the three-dimensional space scene.

16. The VR apparatus according to claim 11, wherein the operations further comprise:

displaying a third bullet screen based on a first preset track in the three-dimensional space scene, the first preset track passes through a fifth position and a sixth position, and the fifth position and the sixth position have different depths in the three-dimensional space scene.

17. A non-transitory computer readable storage medium storing a plurality of programs in connection with a Virtual Reality (VR) apparatus for displaying a bullet screen, wherein the plurality of programs, when executed by the VR device, cause the VR device to perform operations including:

rendering a virtual three-dimensional space scene using the VR device;

displaying a frame in the virtual three-dimensional space scene;

defining a first position and a second position, the first position and the second position having different visual depths in the three-dimensional space scene;

displaying a first bullet screen at at least one of the first position and the second position in the three-dimensional space scene.

18. The non-transitory computer readable storage medium according to claim 17, wherein the operations further comprise:

obtaining a fixation point;

selecting a target bullet screen located at the fixation point from bullet screens of the three-dimensional space scene; and changing a display mode of the target bullet screen.

19. The non-transitory computer readable storage medium according to claim 17, wherein a distance in the depth direction between the first position and the user view angle is greater than a distance in the depth direction between the second position and the user view angle, wherein:

a font size of the first bullet screen is greater than a font size of the second bullet screen;

a repeated playing speed of the first bullet screen is greater than a repeated playing speed of the second bullet screen; or a text contrast ratio of the first bullet screen is less than a text contrast ratio of the second bullet screen.

20. The non-transitory computer readable storage medium according to claim 17, wherein the three-dimensional space scene comprises a binocular imaging region and a monocular imaging region, bullet screens displayed in the binocular imaging region are located at positions having different depths in the three-dimensional space scene and bullet screens displayed in the monocular imaging region are located at positions having the same depth in the three-dimensional space scene.

* * * * *